May 16, 1933.  J. B. HIRSCH  1,908,755
NOISELESS SHACKLE
Filed March 3, 1932
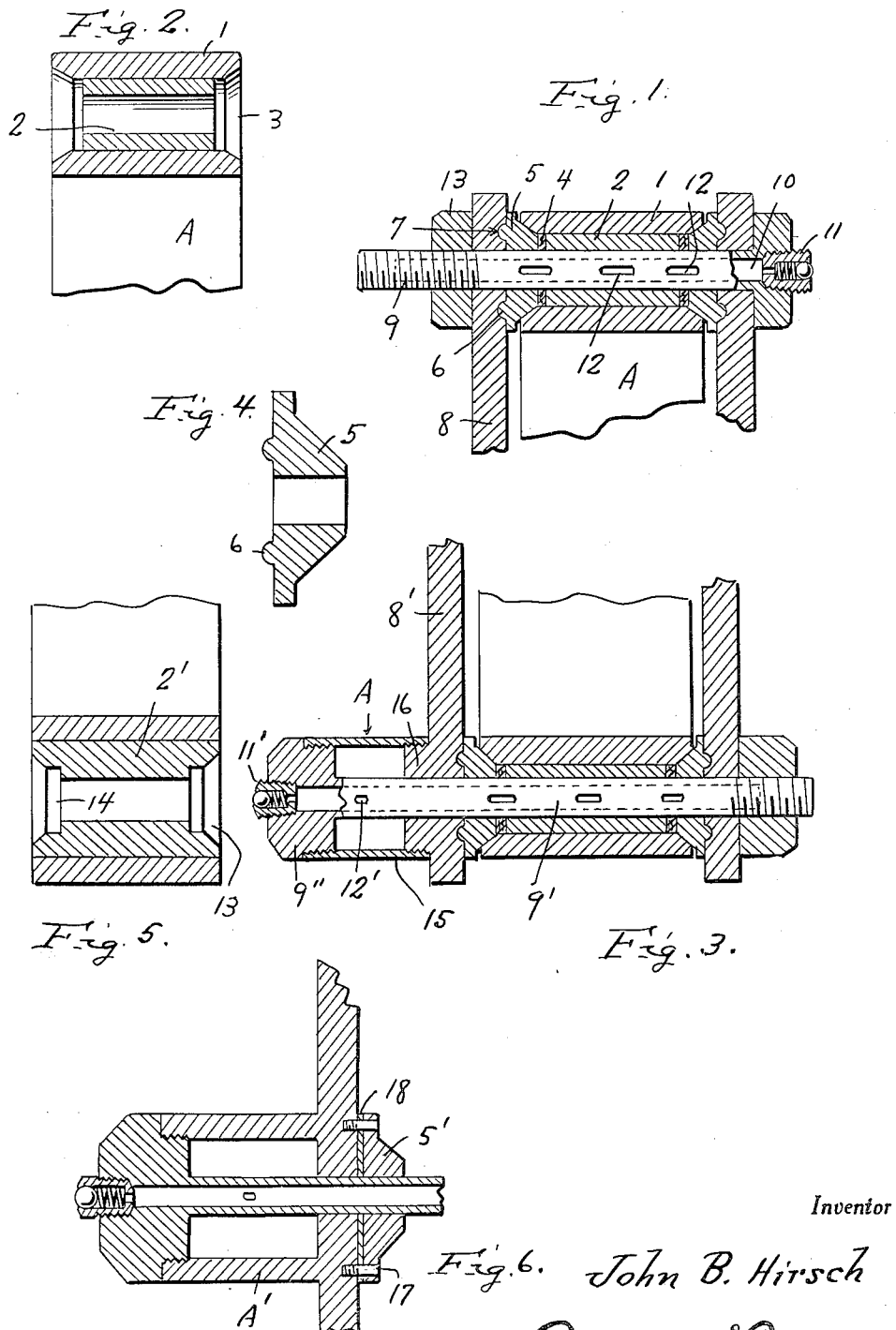
Inventor
John B. Hirsch
By Clarence A. O'Brien
Attorney Patented May 16, 1933

1,908,755

UNITED STATES PATENT OFFICE

JOHN B. HIRSCH, OF ZANESVILLE, OHIO

NOISELESS SHACKLE

Application filed March 3, 1932. Serial No. 596,596.

This invention relates to a noiseless shackle mainly designed for the springs of an automobile or the like, the general object of the invention being to provide a bushing in the spring eye, with gaskets at the ends of the bushing and conical members fitting in the eye for pressing the gaskets against the ends of the bushing, with means for introducing oil or lubricant into the bolt which is provided with openings to distribute the lubricant to the parts within the eye of the spring.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a sectional view through the improved shackle.

Fig. 2 is a sectional view through the spring eye and showing the bushing therein.

Fig. 3 is a sectional view showing a modification.

Fig. 4 is a sectional view through one of the conical members.

Fig. 5 is a sectional view showing a further modification.

Fig. 6 is a sectional view showing a different form of oil chamber.

Referring to Figs. 1 and 2, the numeral 1 indicates the eye of the spring A and the numeral 2 indicates the bushing placed in said eye and of much less length than the length of the eye, the ends of the eye flaring outwardly as shown at 3. The inner ends of these flaring parts are spaced from the ends of the bushing so that gaskets 4 may be placed in said spaces. Substantially frusto-conical members 5 extend into the flaring parts and contact the gaskets, and these parts 5 are provided with projections 6 on their outer ends for engaging recesses 7 in the shackle plates. These projections hold the members 5 against movement. The bolt 9 is formed with a bore 10, which terminates short of the threaded end of the bolt, and passes through the head of the bolt and a grease fitting 11 is threaded in the head and in communication with the bore so that a grease or oil gun can be used to introduce lubricant into the bore 10 of the bolt. The bolt is also formed with the openings 12 which permit some of the lubricant from the bore 10 to pass from the bolt and thus lubricate the bushing and other parts within the eye. The nut on the bolt is shown at 13.

Instead of providing the short bushing and flaring the end of the spring eye, I may provide the bushing shown at 2' in Fig. 5 which is of the same length as the eye and is provided with the flaring ends 13 and the cylindrical parts 14 for receiving the gasket.

This form of bushing eliminates the machining of the spring eye itself which is necessary in the form of the invention shown in Figs. 1, 2 and 3.

Fig. 3 shows an oil reservoir A connected to one of the plates of the shackle with the bolt 9' extended to pass through the reservoir, with the head 9'' of the bolt having a threaded reduced part to close the outer end of the reservoir. This bolt is also formed with an opening 12', communicating with the reservoir, so that some of the oil can pass from the bore of the bolt into the reservoir when the oil is being forced into the bolt through the fitting 11', so as to fill the reservoir, and this oil will pass from the reservoir through the opening 12' into the bore of the bolt and discharge through the other opening in the bolt to lubricate the bushing and the spring eye during the travel of the vehicle.

The reservoir is formed of a cylinder 15 which is threaded to a boss 16 formed on an exterior surface of one of the plates 8'.

Fig. 6 shows a reservoir A' formed directly on the plate with a conical member 5' connected by the screws 17 to the inner face of the plate with the gasket 18 placed between the conical member and the plate.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. A shackle of the class described including its plates and the spring eye located between the plates, a bushing in the eye, a pair of members located between the plates and the ends of the eye, gaskets located between said members and the ends of the bushing, an oil reservoir connected to one of the plates, and a bolt passing through the reservoir, the plates, the two members and the bushing, and with its head closing the outer end of the reservoir, said bolt having a bore and side openings for connecting the bore with the reservoir and with parts within the spring eye and means for introducing lubricant into the bore of the bolt.

2. A shackle of the class described including its plates and the spring eye located between the plates, a bushing in the eye, a pair of members located between the plates and the ends of the eye, gaskets located between said members and the ends of the bushing, an oil reservoir connected to one of the plates, and a bolt passing through the reservoir, the plates, the bushing and the two members, said bolt having a bore and side openings for connecting the bore with the reservoir and with parts within the spring eye and means for introducing lubricant into the bore of the bolt.

In testimony whereof I affix my signature.

JOHN B. HIRSCH.